United States Patent
Nakamura et al.

(10) Patent No.: US 10,986,317 B2
(45) Date of Patent: Apr. 20, 2021

(54) PROJECTION VIDEO DISPLAY DEVICE

(71) Applicants: Maxell, Ltd., Kyoto (JP); Hitachi Industry & Control Solutions, Ltd., Ibaraki (JP)

(72) Inventors: Hiroyuki Nakamura, Oyamazaki (JP); Kazuo Shikita, Oyamazaki (JP); Satoshi Nakayama, Oyamazaki (JP); Nobutaka Hotta, Oyamazaki (JP); Hiroyuki Shinji, Oyamazaki (JP)

(73) Assignees: MAXELL, LTD., Kyoto (JP); HITACHI INDUSTRY & CONTROL SOLUTIONS, LTD., Ibaraki (JP)

( * ) Notice: Subject to any disclaimer, the term of this patent is extended or adjusted under 35 U.S.C. 154(b) by 0 days.

(21) Appl. No.: 16/622,376

(22) PCT Filed: Jul. 12, 2017

(86) PCT No.: PCT/JP2017/025456
§ 371 (c)(1),
(2) Date: Dec. 13, 2019

(87) PCT Pub. No.: WO2019/012637
PCT Pub. Date: Jan. 17, 2019

(65) Prior Publication Data
US 2020/0204767 A1   Jun. 25, 2020

(51) Int. Cl.
*H04N 9/31* (2006.01)
*G03B 21/14* (2006.01)

(52) U.S. Cl.
CPC ......... *H04N 9/3152* (2013.01); *G03B 21/142* (2013.01)

(58) Field of Classification Search
CPC ............. H04N 5/2254; H04N 5/23287; H04N 9/3141; H04N 9/3185; H04N 9/3144;
(Continued)

(56) References Cited

U.S. PATENT DOCUMENTS

| 2006/0039052 | A1* | 2/2006 | Sano | G02B 7/00 |
| | | | | 359/196.1 |
| 2015/0193913 | A1* | 7/2015 | Funada | G06T 11/60 |
| | | | | 345/634 |
| 2016/0366384 | A1* | 12/2016 | Miyata | G03B 21/16 |

FOREIGN PATENT DOCUMENTS

| CN | 101676793 A | 3/2010 |
| JP | 2004-053976 A | 2/2004 |

(Continued)

OTHER PUBLICATIONS

International Search Report of PCT/JP2017/025456 dated Aug. 22, 2017.
(Continued)

*Primary Examiner* — Samira Monshi
(74) *Attorney, Agent, or Firm* — Mattingly & Malur, PC (57) ABSTRACT

A projection video display device includes a projection video display main body (main body) including a light source and a video display element and generating a video to be projected, a portrait converter that rotates the video generated by the main body around an optical axis by 90°, and a projection lens that magnifies and projects the video rotated by the portrait converter. The main body rotates directions of OSD (On Screen Display) images and in the video generated by the video display element to an opposite direction to or in the same direction as a rotation direction of the video by the portrait converter by 90°. Accordingly, the OSD image can be displayed in a direction in which it is easy for the user to see in portrait projection screens.

11 Claims, 8 Drawing Sheets

(58) Field of Classification Search
CPC .... H04N 9/3188; H04N 7/183; H04N 9/3194; H04N 9/3197; H04N 13/363; H04N 5/225; H04N 5/2253; H04N 5/23219; H04N 5/23238; H04N 5/232935; H04N 5/74; H04N 5/77; H04N 7/142; H04N 9/31; H04N 9/3129; H04N 9/3176; H04N 13/344; H04N 13/346; H04N 13/383; H04N 13/395; H04N 17/002; H04N 5/2258; H04N 9/3102; H04N 9/3108; H04N 9/315

See application file for complete search history.

(56) References Cited

FOREIGN PATENT DOCUMENTS

| | | |
|---|---|---|
| JP | 2005-148595 A | 6/2005 |
| JP | 2013-003369 A | 1/2013 |
| JP | 2013-110613 A | 6/2013 |
| JP | 2015-095085 A | 5/2015 |
| JP | 2015-129787 A | 7/2015 |

OTHER PUBLICATIONS

Chinese Office Action received in corresponding Chinese Application No. 201780092211.4 dated Dec. 30, 2020.

* cited by examiner

FIG. 1

(a) FORM AT TIME OF NORMAL (LANDSCAPE) PROJECTION

10a

PROJECTION LENS 2   PROJECTION VIDEO DISPLAY DEVICE MAIN BODY 1

SWITCH

(b) FORM AT TIME OF PORTRAIT PROJECTION

10b

PROJECTION LENS 2   PORTRAIT CONVERTER 3   PROJECTION VIDEO DISPLAY DEVICE MAIN BODY 1

(a) FORM AT TIME OF
NORMAL (LANDSCAPE) PROJECTION

⇕ LANDSCAPE INSTALLATION

PORTRAIT INSTALLATION (b) FORM AT TIME OF
PORTRAIT PROJECTION

PROJECTION VIDEO DISPLAY DEVICE

TECHNICAL FIELD

The present invention relates to a projection video display device that projects a video, and more particularly, to a projection video display device that is suitable for portrait projection of a screen in which a projection video is vertically long.

BACKGROUND ART

In a projection video display device (projector) that projects a video, a projection video is often usually displayed on a landscape screen, but for example, there is a demand for a case in which a display is performed by a portrait screen such as a smartphone screen (hereinafter, portrait projection). In order to perform the portrait projection, if the projection video display device normally used in the landscape state is used in the portrait state, it is possible to change from a landscape screen to a portrait screen and display it. On the other hand, a configuration in which an elevation angle mirror that bends a direction of a projection video is disposed is disclosed in order to perform the portrait projection in the projection video display device in the landscape state without change in, for example, Patent Document 1.

CITATION LIST

Patent Document

Patent Document 1: JP 2004-53976 A

SUMMARY OF THE INVENTION

Problems to be Solved by the Invention

In a case in which the projection video display device is used in the portrait state, it is desirable that the portrait projection can be performed in the landscape state of the projection video display device without change since it is subject to the restrictions of an installation environment. In this case, in order to convert a landscape screen (in which a longitudinal direction of the projection video is parallel to a horizontal direction) to a portrait screen (in which the longitudinal direction of the projection video is parallel to the vertical direction), a conversion optical system (corresponding to the elevation angle mirror in Patent Document 1) that rotates the vertical and horizontal directions of videos generated by a video display unit by 90° is disposed. The video displayed by the projection video display device includes not only input video information but also an OSD image (an on screen display image, for example, menu information used to adjust a display function) generated in a projection video display device and the like. Therefore, since the OSD image is rotated along with the video information by the conversion optical system, it is difficult for a user to read the menu information. The same problem applies even in a case in which the portrait projection is performed in the portrait state of the projection video display device, and since the OSD image is rotated along with the video information, it is difficult to read the menu information.

It is an object of the present invention to provide a projection video display device that displays an OSD image in a direction in which it is easy for the user to see in the portrait projection.

Solutions to Problems

A projection video display device according to the present invention includes a projection video display device main body including a light source and a video display element and generating a video to be projected, a portrait converter that rotates the video generated by the projection video display device main body around an optical axis by 90°, and a projection lens that magnifies and projects the video rotated by the portrait converter. The projection video display device main body rotates a direction of an on screen display (OSD) image in the video generated by the video display element to an opposite direction to or in the same direction as a rotation direction of the video by the portrait converter by 90° and generates the OSD image.

Effects of the Invention

According to the present invention, it is possible to provide a projection video display device that displays an OSD image in a direction in which it is easy for the user to see in the portrait projection.

MODE FOR CARRYING OUT THE INVENTION

Hereinafter, exemplary embodiments of the present invention will be described with reference to the appended drawings.

First Embodiment

In a first embodiment, a configuration using a conversion optical system (portrait converter) that converts a landscape screen to a portrait screen will be described.

Figure 1:
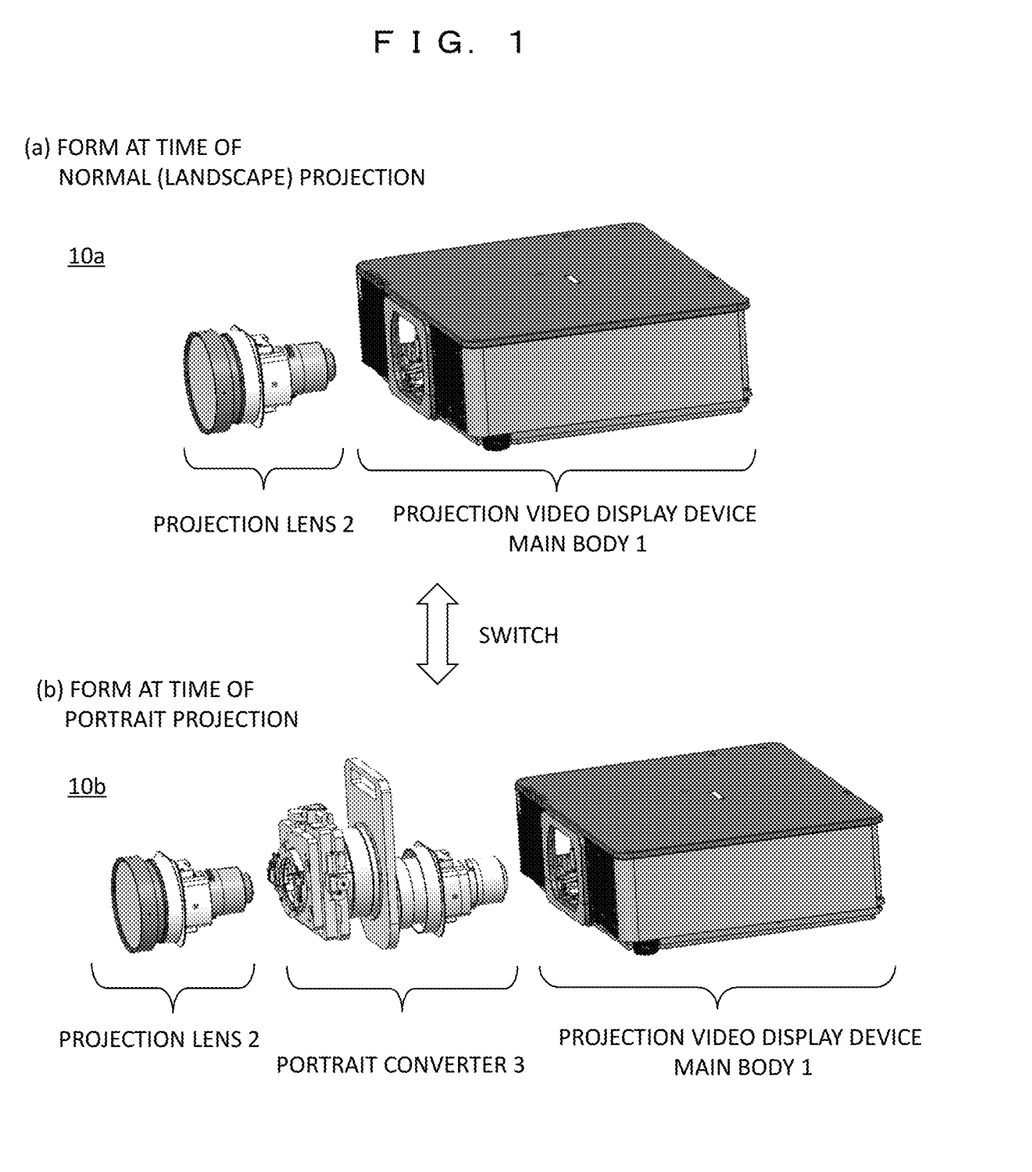
FIG. 1 is an external view illustrating a usage form of a projection video display device according to a first embodiment.

FIG. 1 is an external view illustrating a usage form of a projection video display device (projector) according to the first embodiment. (a) illustrates a form of a projection video display device 10a when a projected video is displayed on the landscape screen (hereinafter referred to as normal projection), and it is used in a state in which a projection lens 2 is installed in a projection video display device main body 1. A video output from the projection video display device main body 1 is magnified by the projection lens 2 and projected onto a screen (projection plane) (not illustrated) with the landscape screen.

(b) illustrates a form of a projection video display device 10b when a projected video is displayed on a portrait screen (portrait projection), and it is used in a state in which a portrait converter 3 and a projection lens 2 are installed in this order in the projection video display device main body 1. Accordingly, the video output from the projection video display device main body 1 undergoes conversion from the landscape screen to the portrait screen by the portrait converter 3 and is projected onto a screen with the portrait screen.

In other words, the projection video display device main body 1 can be switched between the normal projection (a) and the portrait projection (b) by attaching and removing the portrait converter 3 while being installed in the landscape state.

The portrait converter 3 includes an image angle converting unit that converts a landscape image output from the projection video display device main body 1 into a portrait image by rotating it around an optical axis by 90°. The image angle converting unit can convert a direction of an output image with respect to an incident image, for example, by a combination of three prisms. In addition, the portrait converter 3 includes a relay lens unit that shifts an actual position of a video display element in a light travel direction with respect to an actual arrangement position of a video display element (a liquid crystal panel or the like) installed in the projection video display device main body 1 and a lens shift mechanism unit that supports the projection lens 2 disposed on an output side of the image angle converting unit and displaces the projection lens 2 in the up/down/left/right direction.

Incidentally, in the present embodiment, the landscape state is the form of 10a and refers to a state in which the projection video display device is installed such that the longitudinal direction of the projection video is parallel to the horizontal direction. Incidentally, there are two types of landscape states: a stationary installation in which the projection video display device is installed on a desk and a ceiling installation in which the projection video display device is installed on a ceiling or the like. In the following description, for simplicity, the description will focus on the case of the stationary installation, but the basic operation is similar even in the case of the ceiling installation. In addition, the portrait state is a state in which the projection video display device is installed such that the longitudinal direction of the projection video is parallel to the vertical direction.

Figure 2:
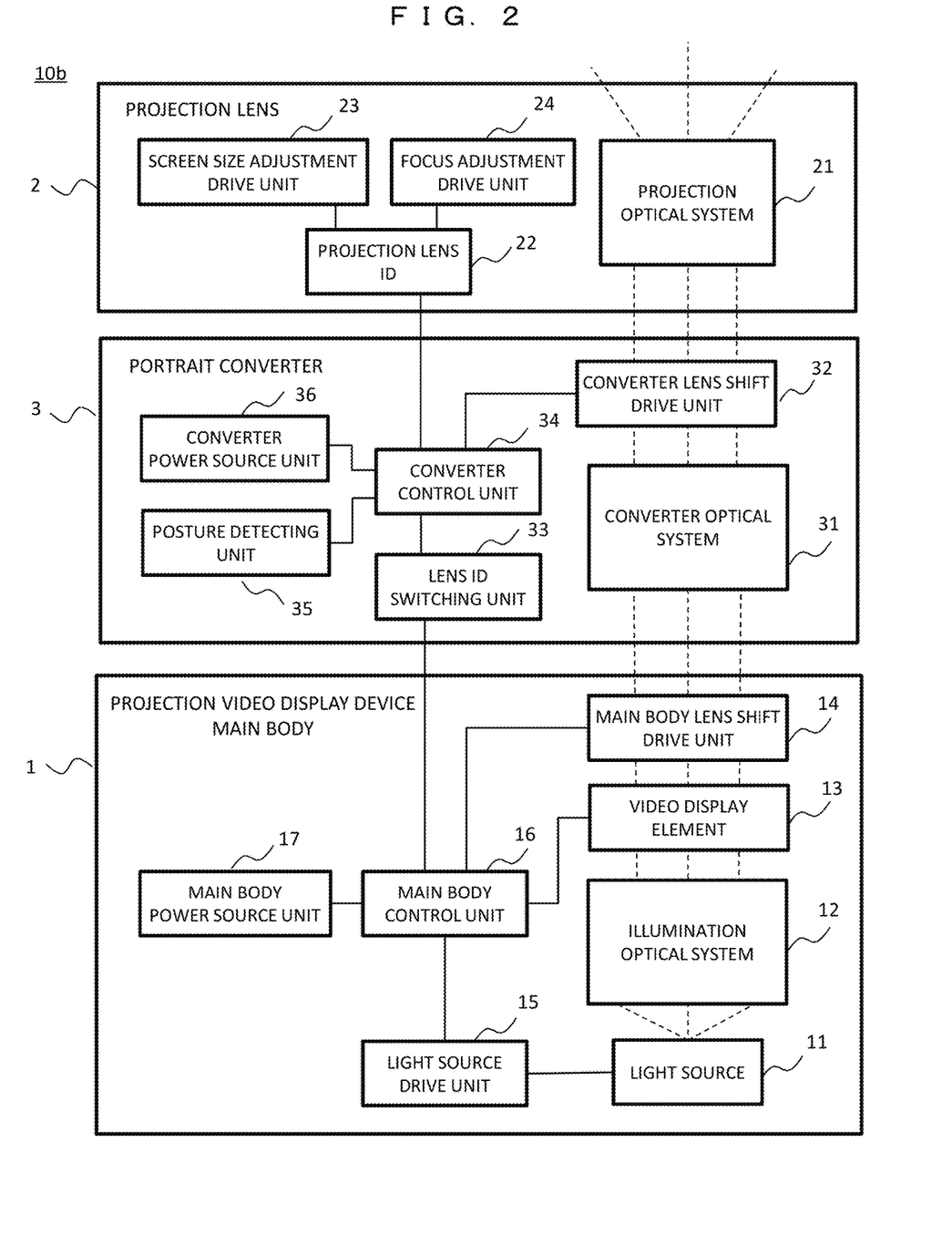
FIG. 2 is a block diagram illustrating an internal configuration of a projection video display device 10b.

FIG. 2 is a block diagram illustrating an internal configuration of the projection video display device 10b that performs the portrait projection. It is divided into the projection video display device main body 1, the portrait converter 3, and the projection lens 2, and an internal configuration of each unit is illustrated.

The projection video display device main body 1 includes a light source 11, an illumination optical system 12, a video display element 13, a main body lens shift drive unit 14, a light source drive unit 15, a main body control unit 16, and a main body power source unit 17. Illumination light emitted from the light source 11 driven by the light source drive unit 15 illuminates the video display element 13 such as an RGB liquid crystal panel through the illumination optical system 12 including an RGB color separation optical system, a relay optical system and the like, so that each RGB video is generated. Each RGB video becomes a color image by a color synthesis optical system, an image position is adjusted by the main body lens shift drive unit 14, and it is output from the projection video display device main body 1 to the portrait converter 3.

The main body control unit 16 transmits a video signal of the video to be projected and an on screen display (OSD) image generated in a device to the video display element 13. The OSD image corresponds to, for example, menu information used to adjust the display function or the like. At this time, the video signal is transmitted in an input screen direction without change, but in the case of portrait projection, the OSD image is rotated by 90° and transmitted. As the rotation direction, it is rotated in an opposite direction to or the same direction as an image rotation direction by the portrait converter 3 according to an ID number specified by a lens ID switching unit 33 in the portrait converter 3.

The portrait converter 3 includes a converter optical system 31, a converter lens shift drive unit 32, the lens ID switching unit 33, a converter control unit 34, a posture detecting unit 35, and a converter power source unit 36.

The converter optical system 31 includes an image angle converting unit that converts a landscape image incident from the projection video display device main body 1 into a portrait image by rotating it around the optical axis by 90° and a relay lens unit that shifts an actual position of the video display element 13 in a light travel direction. The converter lens shift drive unit 32 displaces the projection lens 2 supported by the portrait converter 3 in the up/down/left/right direction and adjusts the video projection position in the screen in the up/down/left/right direction.

For example, the posture detecting unit 35 detects the installation posture of the projection video display device 10b using a posture sensor and transmits a posture detection signal to the converter control unit 34. In other words, it transmits a detection signal indicating whether the current posture is the stationary installation or the ceiling installation. Upon receiving the posture detection signal from the posture detecting unit 35, the converter control unit 34 causes the lens ID switching unit 33 to select the ID number to be displayed in a direction in which the OSD image can be read normally at the current posture. The lens ID switching unit 33 gives an indication of a selected ID number to the main body control unit 16 of the projection video display device main body 1. Accordingly, the main body control unit 16 transmits the OSD image corresponding to the ID number to the video display element 13. That is, for example, in the case of the stationary installation, the OSD image is rotated by 90° in the opposite direction to the image rotation direction by portrait converter 3, and in the case of the ceiling installation, the OSD image is rotated by 90° in the same direction as the image rotation direction by the portrait converter 3. At this time, the display position of the OSD image in the screen may be further moved to a predetermined position, or the aspect ratio of the OSD image may be further changed.

The projection lens 2 includes a projection optical system 21, a projection lens ID 22, a screen size adjustment drive unit 23, and a focus adjustment drive unit 24. The projection optical system 21 includes a plurality of lenses for projection, and the projection lens ID 22 stores the configuration of the lens group with an ID number. The converter control unit 34 reads the ID number of the currently installed projection lens 2 (the projection optical system 21) from the projection lens ID 22 and controls the converter lens shift drive unit 32 according to a lens characteristic. In addition, the screen size adjustment drive unit 23 and the focus adjustment drive unit 24 perform the screen size adjustment and the focus adjustment, respectively.

Figure 3:
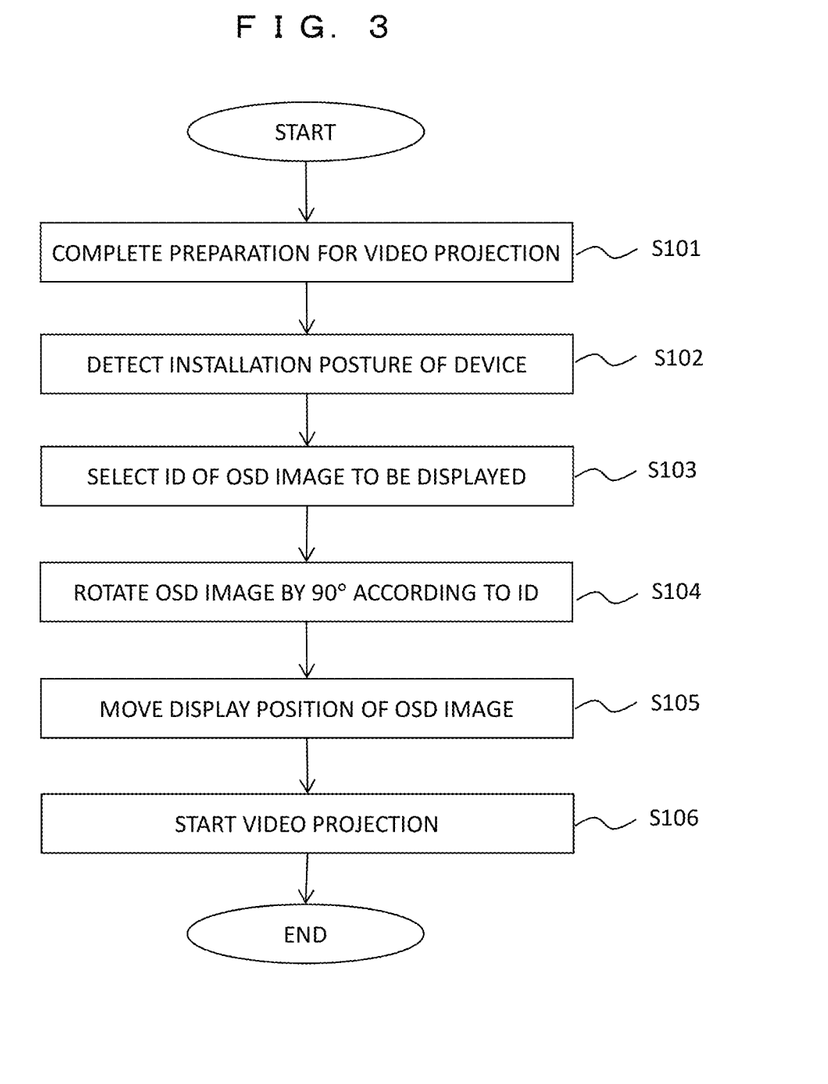
FIG. 3 is a diagram illustrating a portrait projection flowchart.

FIG. 3 is a diagram illustrating a portrait projection flowchart. Here, only a signal switching operation at the time of portrait projection is illustrated.

S101: The projection video display device 10b completes preparation for video projection.

S102: The posture detecting unit 35 detects the installation posture of the projection video display device 10b and transmits the posture detection signal to the converter control unit 34.

S103: Upon receiving the posture detection signal, the converter control unit 34 causes the lens ID switching unit 33 to select the ID number to be displayed in the direction in which the OSD image can be read at the current posture.

S104: The lens ID switching unit 33 gives the indication of the selected ID number to the main body control unit 16 of the projection video display device main body 1. Therefore, the main body control unit 16 rotates the OSD image by 90° according to the ID number.

S105: Further, the main body control unit 16 moves the display position of the OSD image in the screen to a predetermined position or changes the aspect ratio of the OSD image and transmits it to the video display element 13.

S106: The video is output from the projection video display device main body 1 and starts to be projected.

As described above, as a result of rotating the OSD image by 90° in S104 according to the posture detection signal from the posture detecting unit 35, the OSD image is displayed in the normal direction with respect to the user, that is, in a direction in which the user can easily read characters or the like displayed in the OSD image. In addition, the OSD image is displayed at an easy-to-see position in the screen in S105.

Figure 4:
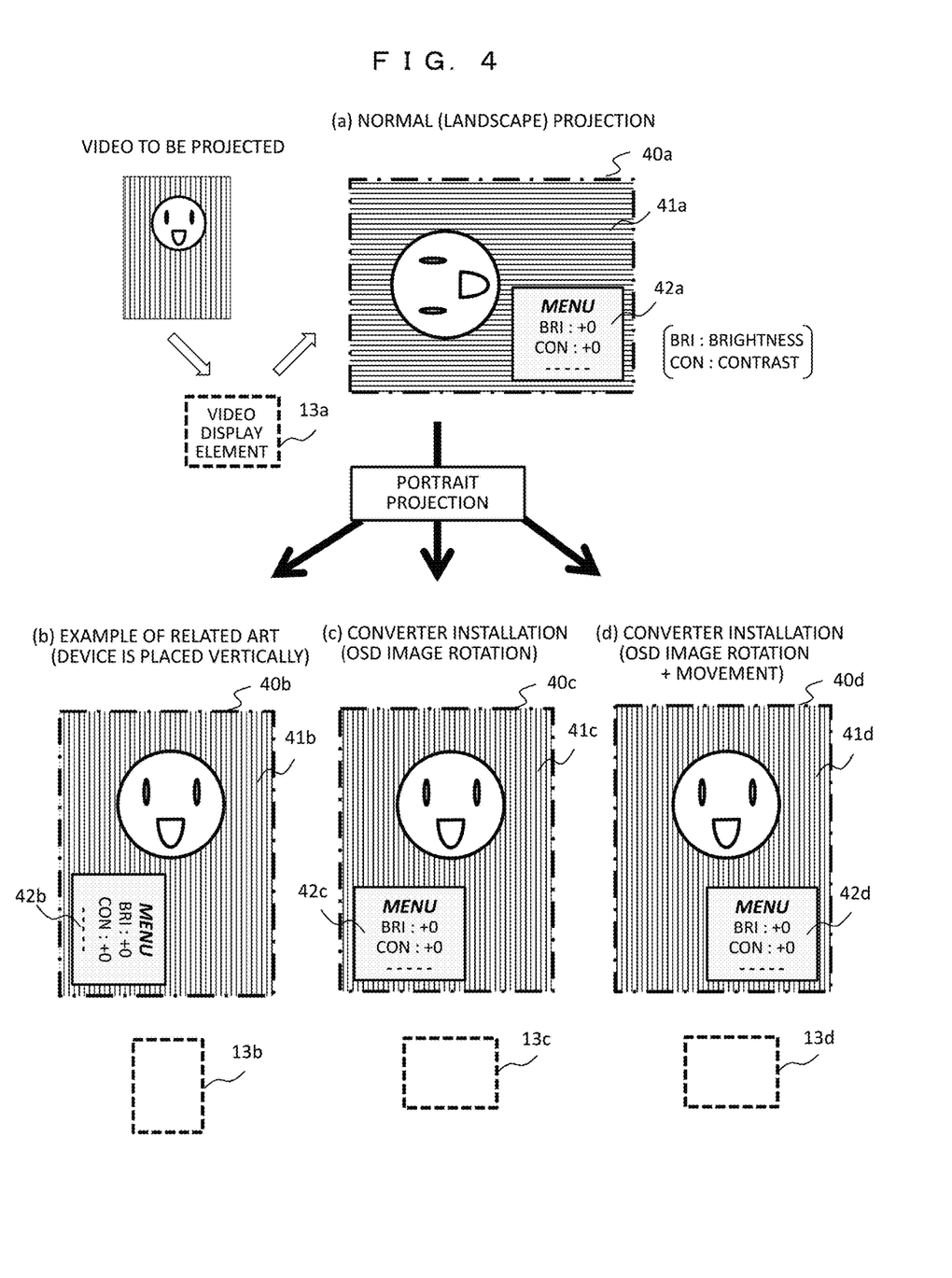
FIG. 4 is a diagram illustrating a display example of an OSD image at the time of portrait projection.

FIG. 4 is a diagram illustrating a display example of the OSD image at the time of portrait projection. The video to be projected here is the portrait video which is desired to be displayed in the portrait screen and is first input in a direction according to an aspect shape of the video display element 13a. That is, in FIG. 4, the portrait video is input to the video display element 13a in a state in which it is rotated by 90°, so that the video generated by the video display element 13a is projected.

(a) illustrates the normal projection state, and it is projected from the projection video display device in the landscape state without change, and a projection video 41a (a face icon and a background thereof) and an OSD image 42a (menu information) are displayed in a landscape projection area 40a (indicated by a dashed-dotted line). Of course, the projection video 41a becomes an overturned state when seen from the user, while the OSD image 42a is displayed in the normal direction in which characters or the like can be read.

For comparison, (b) illustrates the portrait projection of the related art, and the projection video display device is placed vertically, and it is displayed in a portrait projection area 40b. The video display element is rotated by 90° as indicated by 13b. In this case, since an OSD image 42b is rotated and displayed together with a projection video 41b, it is difficult for the user to read the menu information.

(c) and (d) illustrate the portrait projection according to the present embodiment, and since the portrait converter 3 is installed in the projection video display device main body in the landscape state, it is displayed in portrait projection areas 40c and 40d. The video display element is in the landscape state as indicated by 13c and 13d. Accordingly, projection videos 41c and 41d are rotated and displayed. On the other hand, since OSD images 42c and 42d are rotated in the opposite direction at the stage of the projection video display device main body 1, the menu information displayed via the portrait converter 3 is displayed in the normal direction. Further, the display position of the OSD image 42d of (d) is moved to a predetermined position (here, the same position in the lower right corner as that in the normal projection of (a)), and thus it is easy for the user to see the display thereof.

Second Embodiment

In a second embodiment, a configuration in which an OSD image is displayed in an easy-to-see manner in a case in which the portrait projection is performed with no conversion optical system (portrait converter) will be described.

Figure 5:
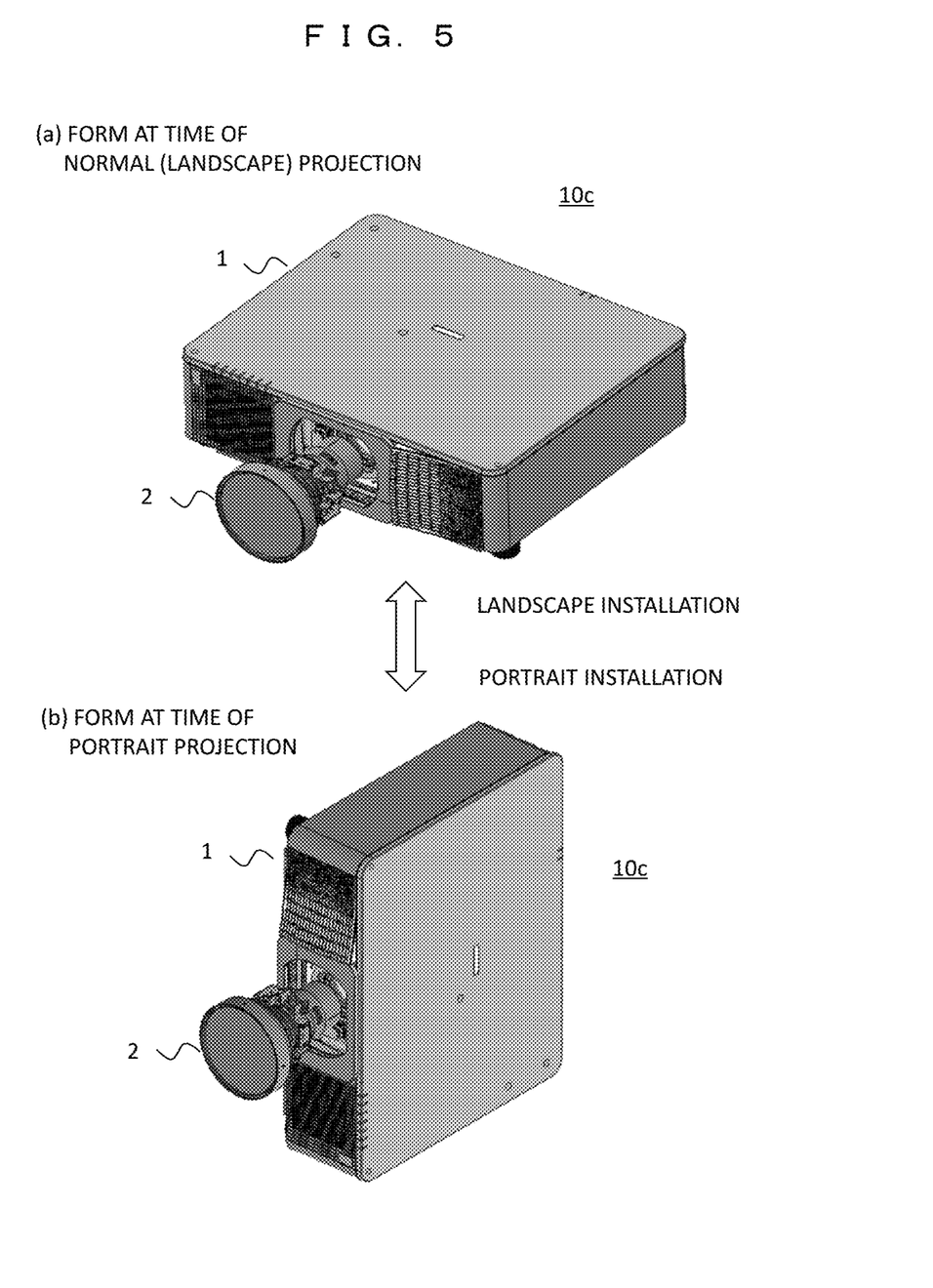
FIG. 5 is an external view illustrating a usage form of a projection video display device according to a second embodiment.

FIG. 5 is an external view illustrating a usage form of a projection video display device (projector) according to the second embodiment. (a) illustrates a normal projection in which a projected video is displayed on the landscape screen, and a projection video display device 10c is installed in the landscape state. (b) illustrates a portrait projection in which a projected video is displayed on the portrait screen, and the projection video display device 10c installed in the portrait state. At this time, the portrait converter 3 used in the first embodiment (FIG. 1) is not installed in the projection video display device 10c, but the projection lens 2 is installed in the projection video display device main body 1.

Figure 6:
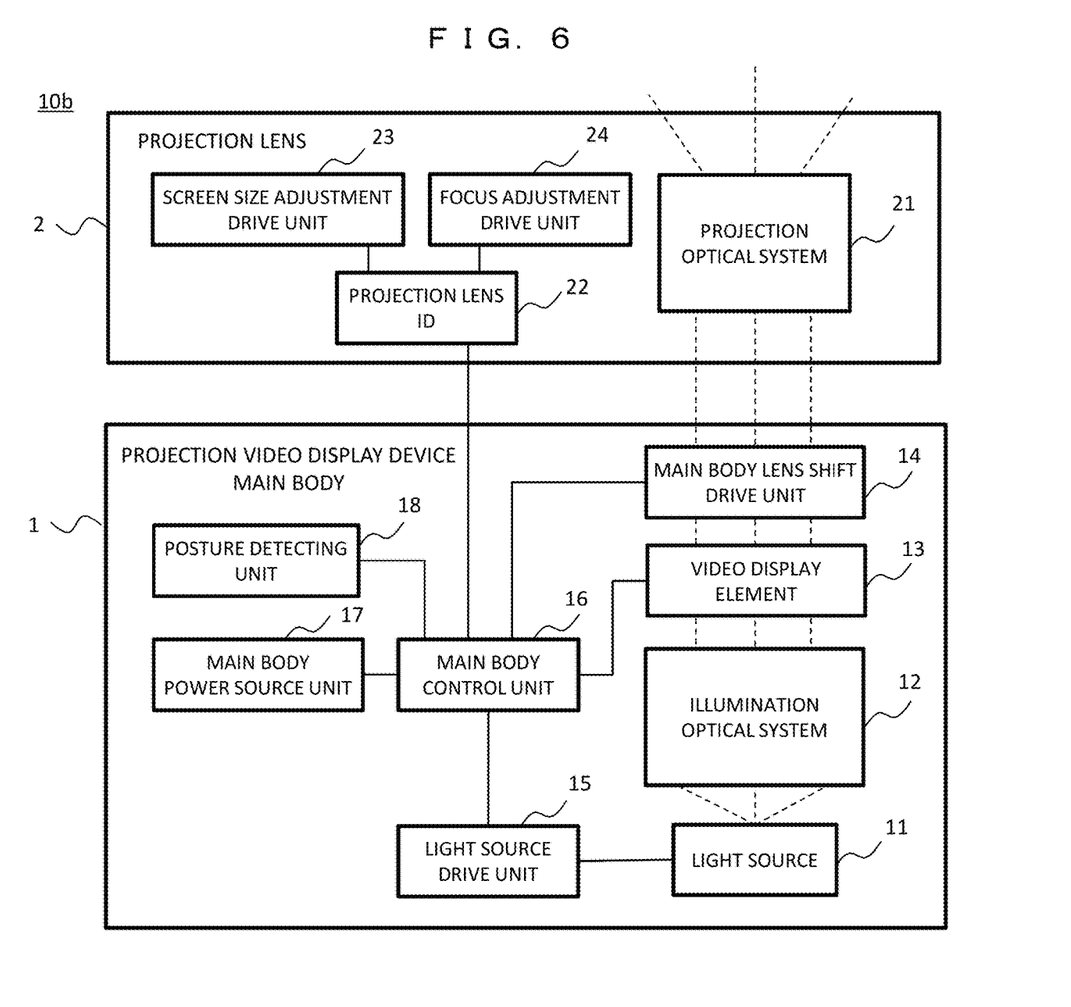
FIG. 6 is a block diagram illustrating an internal configuration of a projection video display device 10c.

FIG. 6 is a block diagram illustrating an internal configuration of the projection video display device 10c according to the second embodiment. As compared with the configuration of the first embodiment (FIG. 2), the portrait converter 3 is eliminated, and a posture detecting unit 18 is added to the projection video display device main body 1. For example, the posture detecting unit 18 detects the installation state of the projection video display device main body 1, that is, whether the installation state is the landscape installation or the portrait installation using a posture sensor, and transmits a detection signal to the main body control unit 16. Upon receiving the detection signal of the portrait installation from the posture detecting unit 18, the main body control unit 16 determines that the portrait projection is being performed, rotates the OSD image by 90°, and transmits it to the video display element 13. At this time, the display position of the OSD image in the screen may be further moved to a predetermined position, or the aspect ratio of the OSD image may be further changed. Alternatively, the main body control unit 16 may prepare a dedicated OSD image for the portrait projection in advance and switch to the dedicated OSD image at the time of portrait projection.

Figure 7:
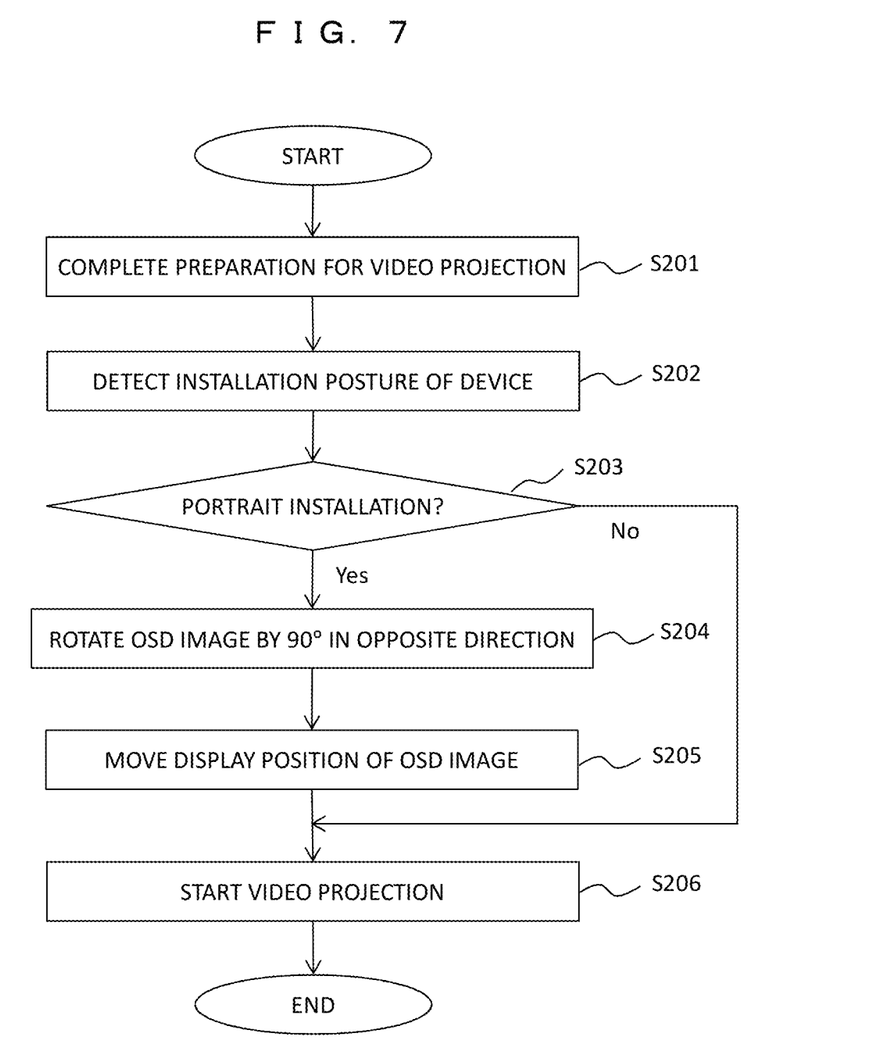
FIG. 7 is a diagram illustrating a portrait projection flowchart.

FIG. 7 is a diagram illustrating a portrait projection flowchart. Here, only a signal switching operation at the time of portrait projection is illustrated.

S201: The projection video display device 10c completes preparation for video projection.

S202: The posture detecting unit 18 detects the installation state (the landscape installation or the portrait installation) of the projection video display device main body 1. The detection signal of the posture detecting unit 18 is transmitted to the main body control unit 16.

S203: The main body control unit 16 determines whether it is a portrait installation based on the detection signal from the posture detecting unit 18. The process proceeds to S204 in the case of the portrait installation or proceeds to S206 in the case of the landscape installation.

S204: In the case of the portrait installation, the main body control unit 16 rotates the OSD image by 90°. The rotation direction is the opposite direction to the rotation direction of the projection video at the time of portrait installation.

S205: Further, the main body control unit 16 moves the display position of the OSD image in the screen to a predetermined position or changes the aspect ratio of the OSD image and transmits it to the video display element 13.

S206: The video is output from the projection video display device main body 1 and starts to be projected.

As described above, when the posture detecting unit 18 detects the portrait installation, the OSD image is rotated by 90° in S204 accordingly, and the OSD image is displayed in the normal direction with respect to the user. In addition, the OSD image is displayed at an easy-to-see position in the screen in S205.

Figure 8:
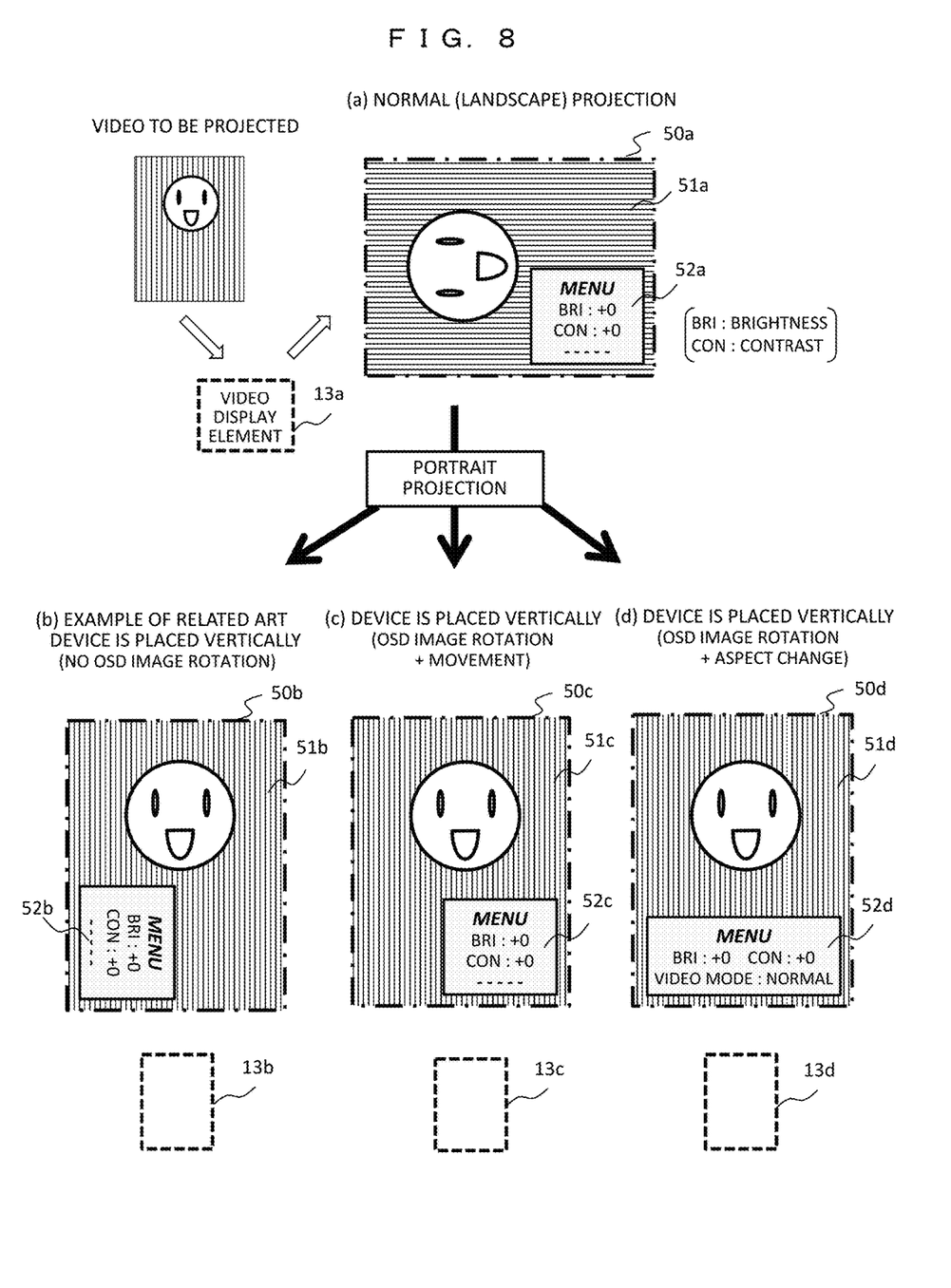
FIG. 8 is a diagram illustrating a display example of an OSD image at the time of portrait projection.

FIG. 8 is a diagram illustrating a display example of the OSD image at the time of portrait projection. Similarly to the first embodiment (FIG. 4), the video to be projected here is the portrait video which is desired to be displayed in the portrait screen and is input in a direction according to an aspect shape of the video display element 13*a*.

(a) illustrates the normal projection state, and it is projected from the projection video display device in the landscape state without change, and a projection video 51*a* (a face icon and a background thereof) and an OSD image 52*a* (menu information) are displayed in a landscape projection area 50*a* (indicated by a dashed-dotted line).

For comparison, (b) illustrates the portrait projection of the related art, and the projection video display device is placed vertically, and it is displayed in a portrait projection area 50*b*. The video display element is rotated by 90° as indicated by 13*b*. In this case, since the OSD image 52*b* is rotated and displayed together with the projection video 51*b*, it is difficult for the user to read the menu information.

(c) and (d) illustrate the portrait projection according to the present embodiment, and the projection video display device is placed vertically and displayed in portrait projection areas 50*c* and 50*d*. At this time, as OSD images 52*c* and 52*d*, the OSD images generated by the projection video display device main body 1 are rotated in the opposite direction to the rotation direction accompanied with the portrait installation of the projection video display device, and thus the menu information displayed by the portrait installation is in the normal direction. Further, the display position of the OSD image 52*c* of (c) is moved to a predetermined position (here, a position in the lower right corner), and the image aspect ratio (the OSD image size) of the OSD image 52*d* of (d) is changed, and thus it is easier for the user to see the display thereof.

Although the embodiments of the present invention have been described above, the present invention is not limited thereto and can be carried out within the scope that does not change the gist of the present invention. For example, it goes without saying that the OSD image presented to the user contains not only the menu information but also arbitrary information including an image. In addition, in the portrait projection, even when the rotation angle θ of the projection screen is not 90°, the OSD image which it is easy for the user to see can be displayed by setting the rotation angle of the OSD image to −θ in the opposite direction. Further, the display position or the aspect of the OSD image in the portrait projection can be combined in various ways, and the user can select a display format.

Although the above-described embodiments have been described with a case in which the landscape screen is converted into the portrait screen and the portrait projection is performed, the present invention can be applied to the reverse conversion. In other words, even when the normal projection is the portrait screen (the portrait projection) and is converted to the landscape screen, and the projection is performed, the OSD image which it is easy for the user to see can be displayed by rotating the OSD image in the opposite direction.

In addition, the configuration of the projection video display device (projector) is based on the configuration in which the projection lens and the portrait converter are installed in the projection video display device main body, but even in the case of the configuration including only the projection video display device main body or the configuration in which at least one of the projection lens and the portrait converter is installed in the projection video display device main body, the OSD image can be displayed in the direction in which it is easy for the user to see in the portrait projection, and it is a category of the present invention.

REFERENCE SIGNS LIST

1 Projection video display device main body
2 Projection lens
3 Portrait converter
10*a*, 10*b*, 10*c* Projection video display device (projector)
11 Light source
13 Video display element
16 Main body control unit
18 Posture detecting unit
31 Converter optical system
34 Converter control unit
35 Posture detecting unit
40*a* to 40*d*, 50*a* to 50*d* Projection area
41*a* to 41*d*, 51*a* to 51*d* Projection video
42*a* to 42*d*, 52*a* to 52*d* OSD image (menu information)

The invention claimed is:

1. A projection video display device that projects a video, comprising:
    a projection video display device main body including a light source and a video display element and generating a video to be projected;
    a portrait converter that rotates the video generated by the projection video display device main body around an optical axis by 90°; and
    a projection lens that magnifies and projects the video rotated by the portrait converter,
    wherein the projection video display device main body rotates a direction of an on screen display (OSD) image in the video generated by the video display element in an opposite direction from or in a same direction as a rotation direction of the video by the portrait converter by 90°, in accordance with an installation posture of the projection video display device, and generates the OSD image.

2. The projection video display device according to claim 1, wherein the portrait converter includes a posture detecting unit that detects the installation posture of the projection video display device, and
    the projection video display device main body rotates the direction of the OSD image by 90° in accordance with a posture detection signal from the posture detecting unit and generates the OSD image.

3. The projection video display device according to claim 1, wherein the projection video display device main body further moves a position of the rotated OSD image to a predetermined position and generates the OSD image.

4. The projection video display device according to claim 1, wherein the projection video display device main body further changes an aspect ratio of the rotated OSD image and generates the OSD image.

5. The projection video display device according to claim 1,
wherein when the installation state of the projection video display device is a state in which a longitudinal direction of the video projected from the projection lens without going through the portrait converter is parallel to a horizontal direction, and
wherein a video of a portrait screen is projected from the projection lens via the portrait converter.

6. A projection video display device that projects a video, comprising:
a projection video display device main body including a light source and a video display element and generating a video to be projected; and
a projection lens that magnifies and projects the video generated by the projection video display device main body,
wherein the projection video display device main body includes a posture detecting unit that detects whether an installation state of the projection video display device is a landscape installation in which a longitudinal direction of a projection video is parallel to a horizontal direction or a portrait installation in which the longitudinal direction of the projection video is parallel to a vertical direction, and
upon receiving a detection signal of the portrait installation from the posture detecting unit, the projection video display device main body determines that a portrait projection is being performed and rotates a direction of an on screen display (OSD) image in the video generated by the video display element in an opposite direction from a rotation direction of the projection video accompanied with a change from the landscape installation to the portrait installation by 90° and generates the OSD image.

7. The projection video display device according to claim 6, wherein the projection video display device main body further moves a position of the rotated OSD image to a predetermined position and generates the OSD image.

8. The projection video display device according to claim 6, wherein the projection video display device main body further changes an aspect ratio of the rotated OSD image and generates the OSD image.

9. A projection video display device that projects a video, comprising:
a projection video display device main body including a light source and a video display element and generating a video to be projected;
a portrait converter that rotates the video generated by the projection video display device main body around an optical axis by 90°; and
a projection lens that magnifies and projects the video rotated by the portrait converter,
wherein the projection video display device main body rotates a direction of an on screen display (OSD) image in the video generated by the video display element in an opposite direction from or in a same direction as a rotation direction of the video by the portrait converter by 90° and generates the OSD image,
wherein when the installation state of the projection video display device is a state in which a longitudinal direction of the video projected from the projection lens without going through the portrait converter is parallel to a horizontal direction, and
wherein a video of a portrait screen is projected from the projection lens via the portrait converter.

10. The projection video display device according to claim 9, wherein the projection video display device main body further moves a position of the rotated OSD image to a predetermined position and generates the OSD image.

11. The projection video display device according to claim 9, wherein the projection video display device main body further changes an aspect ratio of the rotated OSD image and generates the OSD image.

* * * * *